Oct. 6, 1970

W. G. ANDERS 3,532,405

EJECTOR CONSTRUCTION FOR POWER FILE

Filed Nov. 12, 1968

INVENTOR.
Walter G. Anders
BY
Froase & Bishop
ATTORNEYS

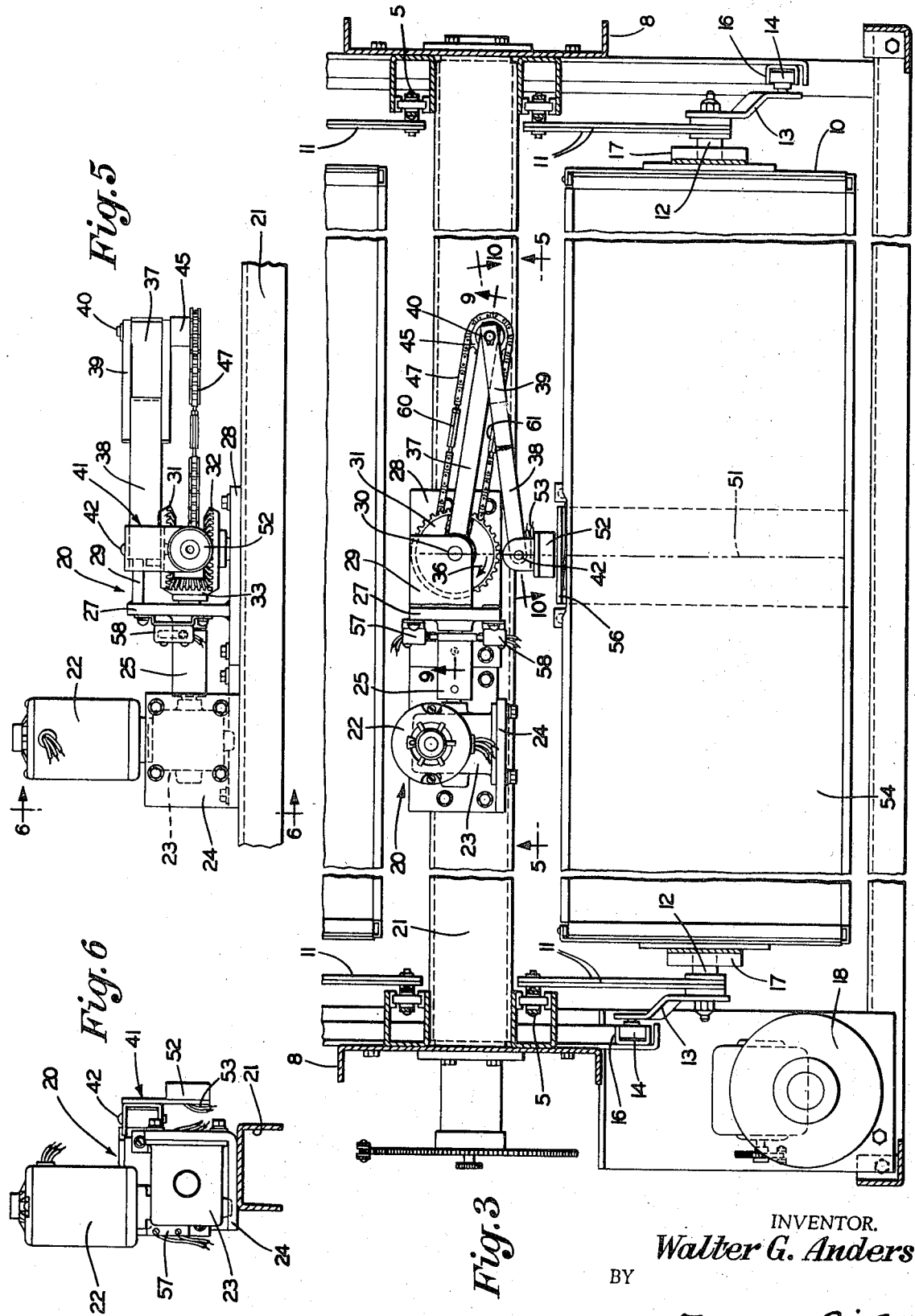

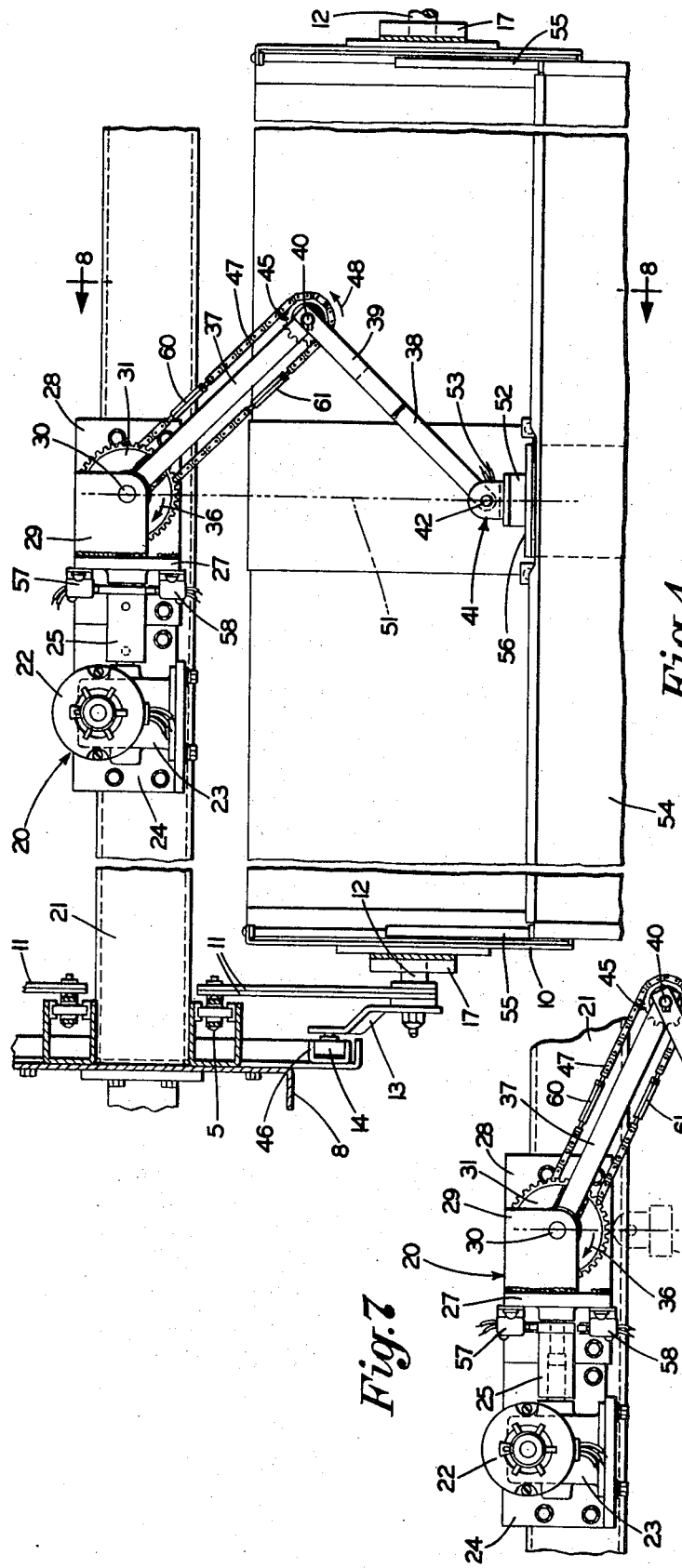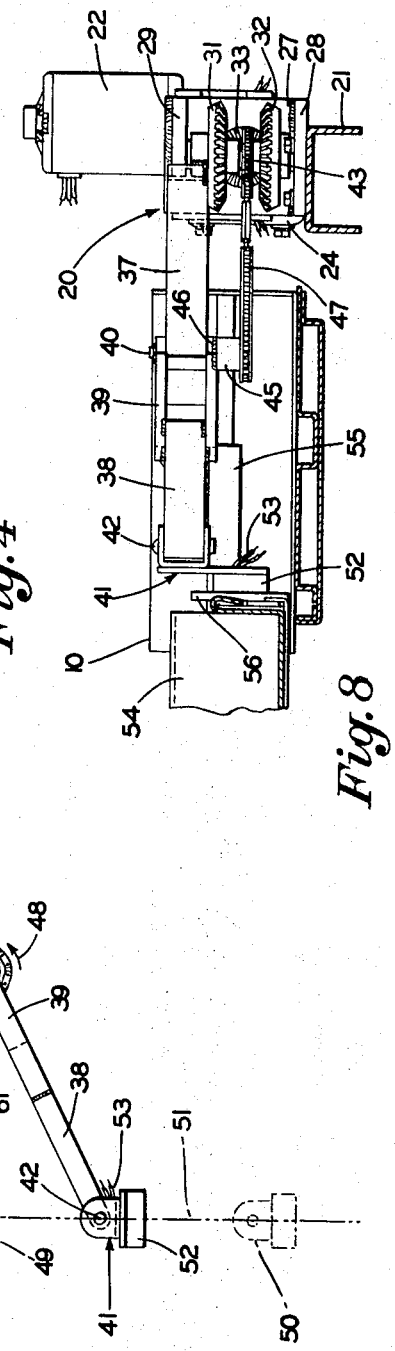

Oct. 6, 1970   W. G. ANDERS   3,532,405
EJECTOR CONSTRUCTION FOR POWER FILE
Filed Nov. 12, 1968   4 Sheets-Sheet 4

INVENTOR.
Walter G. Anders
BY
Frease & Bishop
ATTORNEYS

United States Patent Office 3,532,405
Patented Oct. 6, 1970

3,532,405
EJECTOR CONSTRUCTION FOR POWER FILE
Walter G. Anders, Canton, Ohio, assignor to Diebold,
Incorporated, Canton, Ohio, a corporation of Ohio
Filed Nov. 12, 1968, Ser. No. 774,697
Int. Cl. A47b *49/00, 51/00*
U.S. Cl. 312—223                                                    10 Claims

ABSTRACT OF THE DISCLOSURE

A power operated drawer moving ejector mechanism to move a drawer of a pan-drawer assembly between extended and retracted positions when the assembly is located at the work station of a power filing appliance wherein a number of pan-drawer assemblies travel on an endless conveyor in a continuous orbit. The ejector mechanism is located in a limited space between the flights of travel of the conveyor and imparts positive straight line movement to an actuator head releasably engageable with the drawer to impart movement from a power operated gear-driven scissors type lever arm mechanism through the head to the drawer.

CROSS-REFERENCE TO RELATED PATENTS

The improved ejector mechanism is an improvement upon the structures of Pat. Nos. 3,297,378 and 3,298,766.

BACKGROUND OF THE INVENTION

Field of the invention

The invention relates to a power file of the type in which a plurality of pans are mounted on an endless conveyor for movement in either direction in a continuous orbit of travel and any selected pan is delivered by power means to a work station where a drawer, which may be latched on a pan, unlatched and moved between retracted and extended positions; and more particularly to a drawer moving ejector mechanism which may be located in a minimum amount of space between the flights of travel of the endless conveyor adjacent the work station to impart positive and direct straight line moving forces to a drawer to be moved which is located at the work station.

Description of the prior art

Ejector mechanisms have been provided for actuating the drawers of power files at a work station such as shown in Pat. Nos. 3,279,378 and 3,298,766. These prior mechanisms operate impart the desired rate of movement to the drawer between retracted and extended positions. The actual moving forces, however, are imparted from the ejector mechanism to the drawer through a spring-like thrust unit which transmits forces around a corner from the thrust unit connection with the ejecor mechanism motor drive to the point of engagement of the thrust unit head with the drawer to be moved. These prior structures satisfy the limited space and motion requirements for which they are designed, but because of including a spring, whose characteristics may change, as a part of the thrust unit, their operating characteristics may vary from device to device, and may change as a result of repeated use. Thus, the operation of such prior ejector mechanisms may not be uniform from file to file and as any file ages; and the spring inherently may flex to some degree and therefore does not inflexibly apply a positive force.

SUMMARY OF THE INVENTION

Objectives of the invention include providing a power file ejector mechanism which eliminates the varying characteristics and springiness of a spring member for conveying and applying thrust from a drive located in a confined space between flights of the file conveyor mechanism to a drawer to be moved by such thrust; providing an ejector mechanism which imparts positive straight-line movement to an actuator thrust head which may be releasably connected to a drawer to be moved, from a drive mechanism located in a confined space extending generally at right angles to the direction of straight-line movement; providing an ejector mechanism with scissors-type lever arm means, preferably gear controlled, for transmitting power from the drive motor to the actuator head of the ejector mechanism for imparting straight-line movement to the head; and providing an ejector mechanism eliminating difficulties heretofore encountered, achieving the indicated objectives simply, effectively and inexpensively, and solvng problems and satisfying needs existing in the art.

These objectives and advantages are obtained by the power operated ejector construction for moving a drawer of a power file, the general nature of which may be stated as including, in power-operated ejector construction for moving the drawers of a power file of the type in which a plurality of pans are mounted on an endless conveyor mechanism carried by support means for movement in either direction in a continuous orbit of travel having at least one flight of travel in a plane extending parallel with the orbital axes and any selected pan is delivered by conveyor drive power means to a predetermed work station location, and in which a drawer is supported on each pan as a pan-drawer assembly on suspension mechanism which permits the drawer to be moved between ejected and retracted positions through a file access opening provided in the file case at said work station location; a support member mounted on the support means adjacent the work station and between flights of orbital conveyor travel, and drawer ejector mechanism; the ejector mechanism including motor means mounted on the support member and having a drive shaft, and scissors-type lever arm means mounted on the support member; said lever arm means including a first shaft having a vertical axis, a first lever arm pivotally mounted at one end on said first shaft axis, the other end of the first arm having a second pivot axis, a second lever arm, means pivotally mountnig one end of the second arm on said second pivot axis, the other free end of said second arm having a third pivot axis, an actuator head pivotally mounted on the third pivot axis at the free end of said second arm, and the effective lever arm length of said first and second lever arms between the pivot axes at the ends thereof being the same; drive means operatively connected between said motor drive shaft and said first arm about the first axis between ejected and retracted positions, a first sprocket mounted on said first shaft axis, a second sprocket mounted on said second pivot axis, and operative connections between said arms and sprockets for rotating the second arm about the second pivot axis as the first arm is rotated about the first shaft axis for moving the actuator head between ejected and retracted positions; and said actuator head being moved in a straight line of travel perpendicular to a plane passing through the orbital axes as the actuator head moves between ejected and retracted positions.

BRIEF DESCRIPTION OF THE DRAWINGS

A preferred embodiment of the invention—illustrative of the best mode in which applicant has contemplated applying the principles—is set forth in the following description and shown in the drawings and is particularly and distinctly pointed out and set forth in the appended claims.

FIG. 3 is a plan sectional view of the file taken on the line 3—3, FIG. 2, showing a pan at the work station with the drawer thereon in closed position and showing the general location of the improved ejector mechanism, certain of the parts being broken away;

FIG. 4 is a view similar to a portion of FIG. 3, but showing a drawer and the ejector mechanism in ejected position;

FIG. 5 is a fragmentary side elevation of the ejector mechanism looking in the direction of the arrows 5—5, FIG. 3;

FIG. 6 is an end view of the parts shown in FIG. 5 looking in the direction of the arrows 6—6, FIG. 5;

FIG. 7 is a fragmentary view showing the ejector mechanism in full lines at an intermediate stage of operation, illustrating the straight-line path of movement of the actuator head;

FIG. 8 is a sectional view looking in the direction of the arrows 8—8, FIG. 4;

Similar numerals refer to similar parts throughout the drawings.

DESCRIPTION OF THE PREFERRED EMBODIMENT

Figures 1, 2:
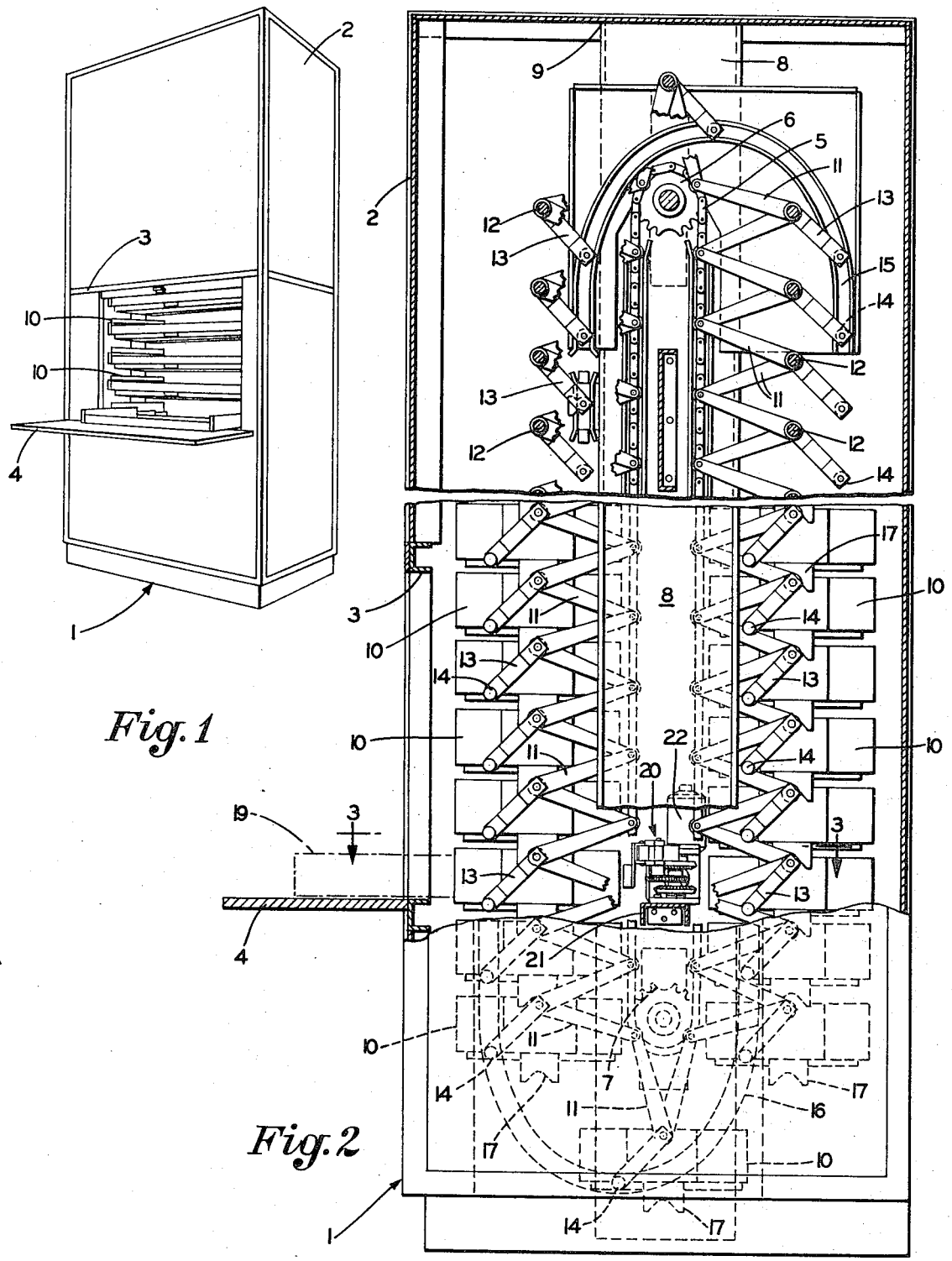
FIG. 1 is a perspective view of a power file equipped with the improved ejector construction.
FIG. 2 is an enlarged side elevation with parts broken away and in vertical section at various locations looking from the right side of FIG. 1, showing the pans in full lines in one sectional portion, and showing a drawer in dot-dash lines ejected from one pan at a work station by the improved ejector construction.

The improved ejector or ejector-retractor mechanism for power files is illustrated and described in the drawings in connection with a power file of the general type shown in Pat. Nos. 3,166,366, 3,297,378 and 3,298,766.

The file is indicated generally at 1 and may include a housing or cabinet 2, the front wall of which may be provided with an opening 3 above a counter or work station 4. A pair of conveyor chains 5 trained over sprockets 6 and 7 mounted on upright support members 8 carried at 9 within housing 2 mount a series of pans 10 for movement in either direction in a continuous orbit of travel.

Each pan 10 is mounted at each end on a pair of arms 11 fixed to a chain 5, and the arms 11 pivotally support an end of a pan 10 at 12. A stabilizing arm 13 is fixed to each end of each pan 10 having a roller 14 at its other end. Rollers 14 engage and are guided in movement around the upper and lower ends of the path of conveyor travel by semicircular guide channels 15 and 16 to maintain pans 10 in a horizontal position throughout the upper and lower ends of the orbit of travel on conveyor 5 when traveling around sprockets 6 and 7. Horizontal positioning of pans 10 is maintained during travel in the vertical flights between sprockets 6 and 7 by engagement of a V-ear 17 at each end of one pan with the pivot shaft 12 of the pan next below.

Conveyor 5 is driven in a suitable manner from drive motor 18 (FIG. 3) which may be a reversing motor, operated preferably by selector switches and a rotary selector control switch, not shown, of a type such as disclosed in Pat. No. 3,198,894. The detailed construction and operation of the conveyor, housing, etc. previously described herein may be of the type shown in Pat. No. 3,199,658.

Power files such as shown in the patents referred to comprise a plurality of pans mounted on an endless conveyor for movement in either direction in a continuous orbit of travel. Any selected pan may be delivered by power operation of the conveyor to a location opposite the work station 4. A drawer on a suspension mechanism forming a part of any pan-drawer assembly delivered to the work station may be moved manually between extended position, such as shown in dot-dash lines at 19 in FIG. 2, and a retracted position located in the path of the orbit of travel, such as shown in the full-line position of pans 10 in FIG. 2. Also, any drawer on any pan-drawer assembly at any other location accessible at the access opening 3 of FIG. 2 may be moved manually between extended and retracted positions.

Alternately, a drawer of a pan-drawer assembly located at the work station 4 may be moved between extended and retracted positions by power mechanism and automatic controls of the general type shown in said Pat. Nos. 3,297,378 and 3,298,766. In accordance with the concepts of the invention, the improved drawer-moving or ejector-retractor construction, hereinafter sometimes termed ejector mechanism, for the power ejection and retraction movement of any drawer located at work station 4, is constructed and operated as described below.

The improved ejector mechanism generally indicated at 20 is located in the limited space available between the rear or right of the pans 10 in the flight of travel at the left of FIG. 2 and the front or left of the pans in the flight of travel at the right of FIG. 2. The mechanism 20 is mounted and supported on channel members 21 (FIGS. 3 and 4) extending between upright support members 8 at either end of power file 1 within cabinet 2.

Figure 9:
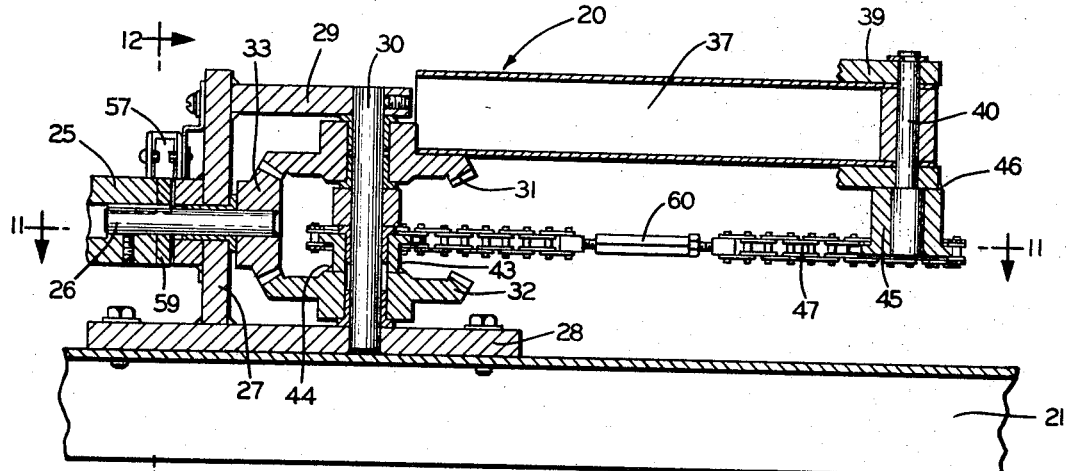
FIG. 9 is an enlarged sectional view taken on the line 9—9, FIG. 3.

Ejector mechanism 20 preferably includes a power operated reversing motor 22 mounted on a housing 23 carried by bracket 24 which is, in turn, bolted to channel member 21 (FIGS. 3, 5 and 6). Motor 22 through reduction gears in housing 23 drives shaft 25 in either direction. Shaft 25 is fixed to stud shaft 26 (FIG. 9) which is journalled in a bracket 27 mounted on base plate 28 also bolted to channel support member 21.

Figure 11:
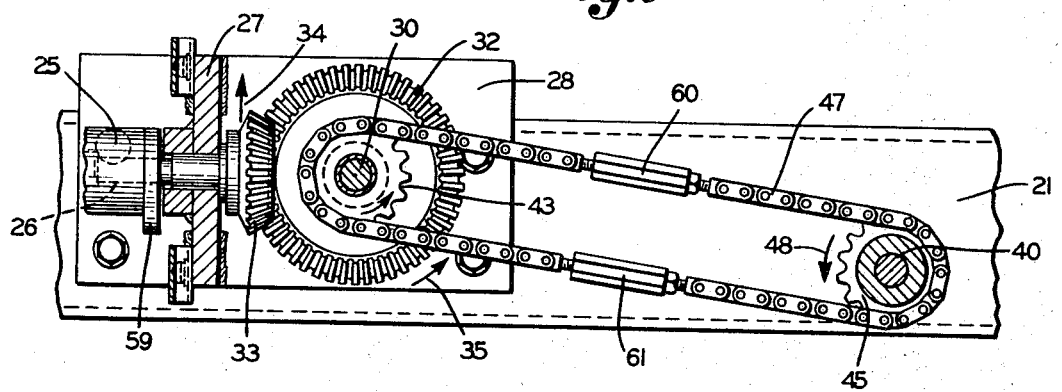
FIG. 11 is a plan sectional view looking in the direction of the arrows 11—11, FIG. 9.

Bracket 27 has a top flange 29 and a shaft 30 mounted at either end in flange 29 and plate 28 journals similar upper and lower bevel gears 31 and 32 which mesh with and are driven by bevel pinion 33 mounted on the projecting end of stub shaft 26. Thus, when pinion 33 is driven by motor 22 in the direction of the arrow 34 in FIG. 11, lower gear 32 rotates counterclockwise (FIG. 11) as indicated by the arrow 35 and upper gear 31 rotates clockwise as indicated by the arrow 36 in FIGS. 3, 4 and 7.

Lever arm 37 is mounted on and fixed to upper gear 31 and another lever arm 38 has its bifurcated end 39 pivotally mounted on pivot pin 40 journalled in the outer end of lever arm 37. An actuator head 41 is pivotally mounted at 42 on the free end of lever arm 38. The lever arm length of lever 38 between pivot pins 40 and 42 equals the lever arm length of lever arm 37 between pivot pin 40 and shaft 30.

A sprocket 43 is journalled on shaft 30 and is fixed with respect to lower gear 32 as by welding at 44. A sprocket 45 having the same number of teeth and the same pitch diameter as sprocket 43 is journalled on shaft 40 and is fixed to the bifurcated end 39 of lever arm 38 as by welding at 46.

Thus, when motor 22 is driven in one direction to drive pinion 33 in the direction of the arrow 34, upper gear 31 rotates clockwise in the direction of the arrow 36 (FIGS. 3, 4 and 7) and lever arm 37 moves from the retracted position of FIG. 3 to extended position of FIG. 4.

Meanwhile, lower gear 32 and sprocket 43 are driven in a counterclockwise direction as shown by the arrow 35 (FIG. 11) and sprocket 43 through chain 47 drives sprocket 45 counterclockwise as shown by the arrows 48. Since lever arm 38 is connected to sprocket 45, lever arm 48 moves from the retracted position of FIG. 3 to the extended position of FIG. 4.

Thus, the movement of lever arms 37 and 38 is a scissors-like movement, and since both lever arms have the same effective length, pivot pin 42 at the outer or free end of lever arm 38 moves from the retracted position of actuator head 41 indicated by dot-dash lines 49 (FIG. 7) to the extended position as indicated by dot-dash lines at 50, so that the pivot pin 42 and, therefore, the actuator head 41, moves in a straight line between retracted and exended positions as indicated by the dot-dash line 51.

The mechanical advantage provided by the scissors-type lever arm mechanism 37–38 driven in the manner described, results in movement of the actuator head 41 toward and away from a plane passing through shaft 30 normal to line 51 twice as fast as the concurrent movement of pivot pin 40 toward and away from such plane.

The actuator head 41 preferably is provided with an electromagnet 52 energized through power cable 53 connected to a suitable source of power. Each pan 10 has a drawer 54 mounted by usual suspension means 55 on its pan 10 so that the drawer 54 may be moved between extended position shown in FIG. 4 and retracted position shown in FIG. 3.

Each drawer 54 in retracted position preferably is latched to its pan 10 by a latch mechanism generally indicated at 56. When magnet 52 of actuator head 41 is moved to engage latch mechanism 56, drawer 54 is unlatched and actuator head 41 during continued movement along line 51 moves drawer 54 to extended position of FIG. 4, indicated at 50 in FIG. 7. Meanwhile, magnet 52 has been energized so that upon reversing the direction of drive motor 22 the ejector mechanism 20 retracts drawer 54 from extended position of FIG. 4 to retracted position of FIG. 3. All this time magnet 52 is de-energized and drawer 54 is again latched to pan 20 by latch mechanism 56.

Figures 10, 12:
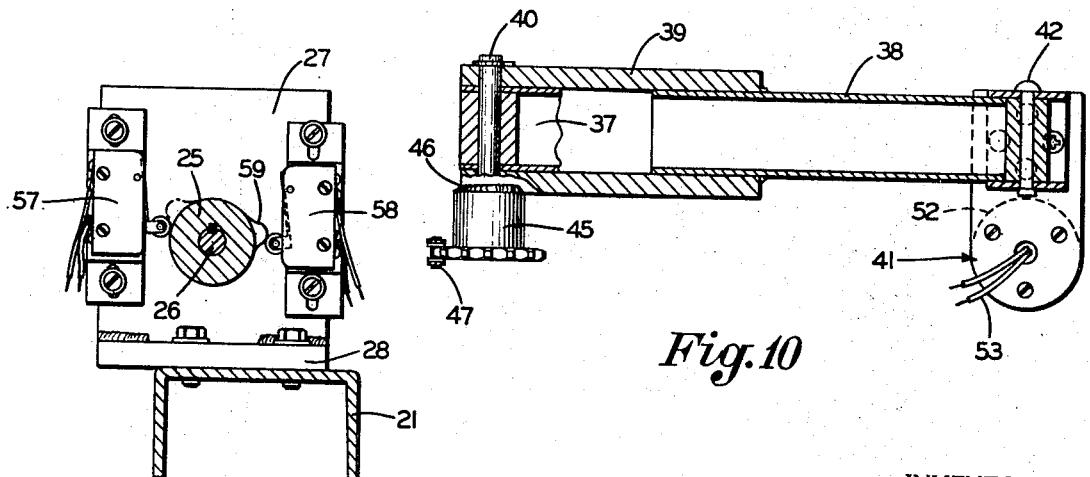
FIG. 10 is an enlarged fragmentary sectional view looking in the direction of the arrows 10—10, FIG. 3.
FIG. 12 is a sectional view taken on the line 12—12, FIG. 9, illustrating the parts in full lines in the retracted position of FIGS. 3 and 9.

Operation of motor 22 may be controlled by limit switches 57 and 58 (FIG. 12) incorporated in the control circuit for motor 22, the limit switches 57 and 58 being actuated by a cam 59 mounted on stub shaft 26. Cam 59 is shown in full lines actuating limit switch 58 for the retracted position of the ejector mechanism 20, and cam 59 is illustrated in dot-dash lines in a position to actuate limit switch 57 when the ejector mechanism reaches extended position.

Drive chain 47 is provided with turnbuckle adjustments 60 and 61 in each flight so that the sprockets 43 and 45 may be properly oriented one with respect to the other to provide the proper retracted and extended positions 49 and 50 of the actuator head 41 and to provide for eliminating any backlash in the operation of lever arm 38.

The improved ejector mechanism thus provides positive straight-line movement of actuator head 41 in a direction perpendicular to a vertical plane (FIG. 3) passing through shaft 30 and located centrally between the vertical flights of conveyor travel. Further, the improved construction provides for locating the actuator mechanism, drive, etc. in the limited space extending generally laterally (FIG. 3) between the flights of conveyor travel while imparting positive straight line movement of the actuator head 41 in a line perpendicular to the direction of conveyor travel. Also, the improved construction provides for simple power-driven ejector movement of any drawer 54 at the work station 4 without backlash or looseness in the ejector drive components.

Finally, the improved ejector mechanism eliminates maintenance and adjustment problems heretofore encountered, and eliminates variable operating characteristics of the mechanism from file to file or as a result of repeated use. Accordingly, the improved construction eliminates difficulties encountered with prior devices, achieves the objectives indicated, and solves problems which have arisen in the art.

In the foregoing description, certain terms have been used for brevity, clearness and understanding; but no unnecessary limitations are to be implied therefrom because such terms are used for descriptive purposes and are intended to be broadly construed.

Moreover, the description and illustration of the invention is by way of example, and the invention is not limited to the exact structures shown because the parts, components and mechanisms may be varied in size and arrangement to provide other structural embodiments without departing from the fundamental concepts, aspects and principles of the invention.

Having now described the features, discoveries, and principles of the invention, the construction, assembly, characteristics, operation and use of a preferred form thereof, and the advantageous, new and useful results obtained thereby; the new and useful discoveries, principles, apparatus, combinations, parts, elements, subcombinations, structures, and cooperative relationships which characterize the invention are set forth in the appended claims.

I claim:

1. Power-operated ejector construction for moving the drawers of a power file of the type in which a plurality of pans are mounted on an endless conveyor mechanism carried by support means for movement in either direction in a continuous orbit of travel having at least one flight of travel in a plane extending parallel with the orbital axes and any selected pan is delivered by conveyor drive power means to a predetermined work station location, and in which a drawer is supported on each pan as a pan-drawer assembly on suspension mechanism which permits the drawer to be moved between ejected and retracted positions through a file access opening provided in the file case at said work station location; the construction including a support member mounted on the support means adjacent the work station and between flights of orbital conveyor travel, and drawer ejector mechanism; the ejector mechanism including motor means mounted on the support member and having a drive shaft, and scissors-type lever arm means mounted on the support member; said lever arm means including a first shaft having a vertical axis, a first lever arm pivotally mounted at one end on said first shaft axis, the other end of the first arm having a second pivot axis, a second lever arm, means pivotally mounting one end of the second arm on said second pivot axis, the other free end of said second arm having a third pivot axis, an actuator head pivotally mounted on the third pivot axis at the free end of said second arm, and the effective lever arm length of said first and second lever arms between the pivot axes at the ends thereof being the same; drive means operatively connected between said motor drive shaft and said first arm for rotating said first arm about the first axis between ejected and retracted positions, a first sprocket mounted on said first shaft axis, a second sprocket mounted on said second pivot axis, and operative connections between said arms and sprockets for rotating the second arm about the second pivot axis as the first arm is rotated about the first shaft axis for moving the actuator head between ejected and retracted positions; and said actuator head being moved in a straight line of travel perpendicular to a plane passing through the orbital axes as the actuator head moves between ejected and retracted positions.

2. The construction defined in claim 1 in which the motor means is reversing, and in which the drive mean operatively connected between the motor drive shaft and the first arm rotates the first arm first in one direction and then in the other direction upon motor means reversal.

3. The construction defined in claim 1 in which the drive means operatively connected between the motor drive shaft and the first arm includes a pinion on the drive shaft and a gear connected with the first arm; and in which the connection between the arms and sprockets includes a second gear mounted on the first sprocket and meshing with said pinion, the second sprocket being fixed to said second arm, and a chain drive between said sprockets.

4. The construction defined in claim 3 in which the chain drive has adjusting means to vary the rotary orientation between the first and second sprockets.

5. The construction defined in claim 1 in which the motor means drive shaft drives a bevel pinion, in which upper and lower bevel gears mesh with said pinion, in which the upper gear is fixed to the first arm, and in which the lower gear is fixed to the first sprocket.

6. The construction defined in claim 5 in which the first shaft is non-rotatably mounted on the support member, and in which the upper and lower gears and the first sprocket are rotatably journalled on said first shaft.

7. The construction defined in claim 1 in which the means pivotally mounting one end of the second arm on the second pivot axis comprises a pivot pin on which both the first and second arms are journalled, and in which the second sprocket is fixed to said one end of the second arm.

8. The construction defined in claim 1 in which the actuator head is provided with a selectively energized electromagnetic drawer engageable member.

9. The construction defined in claim 1 in which the first, second and third pivot axes each extend vertically and in which the first and second lever arms swing horizontally, scissors-like fashion in moving between ejected and retracted positions.

10. The construction defined in claim 1 in which the motor drive shaft is provided with a rotary cam, in which two limit switches controlling movement of the motor means are mounted on the support means adjacent said cam, and in which the cam actuates one of the limit switches on rotation of the drive shaft in one direction when one of the ejected and retracted positions of the ejector mechanism is reached, and actuates another limit switch on rotation of the drive shaft in the other direction when the other of the ejected and retracted positions of the ejector mechanism is reached.

References Cited

UNITED STATES PATENTS

| | | | |
|---|---|---|---|
| 3,297,328 | 1/1967 | Krug et al. | 312—223 |
| 3,298,766 | 1/1967 | Graber et al. | 312—223 |
| 3,306,691 | 2/1967 | Graber et al. | 312—223 |
| 3,345,117 | 10/1967 | Goldammer et al. | 312—223 |
| 3,464,750 | 9/1969 | Anders | 312—333 X |

CASMIR A. NUNBERG, Primary Examiner

U.S. Cl. X.R.

312—268